United States Patent Office 2,871,644
Patented Feb. 3, 1959

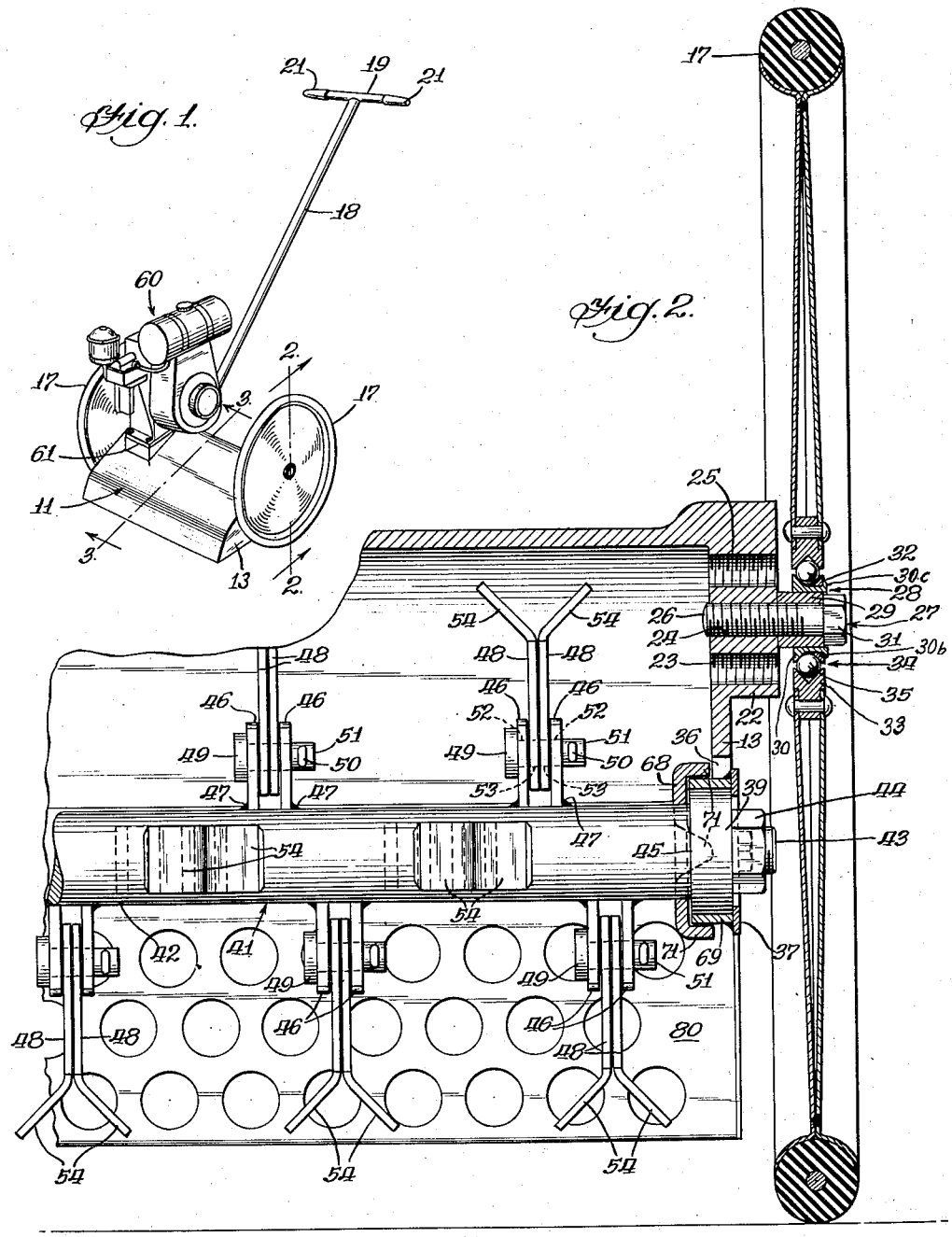

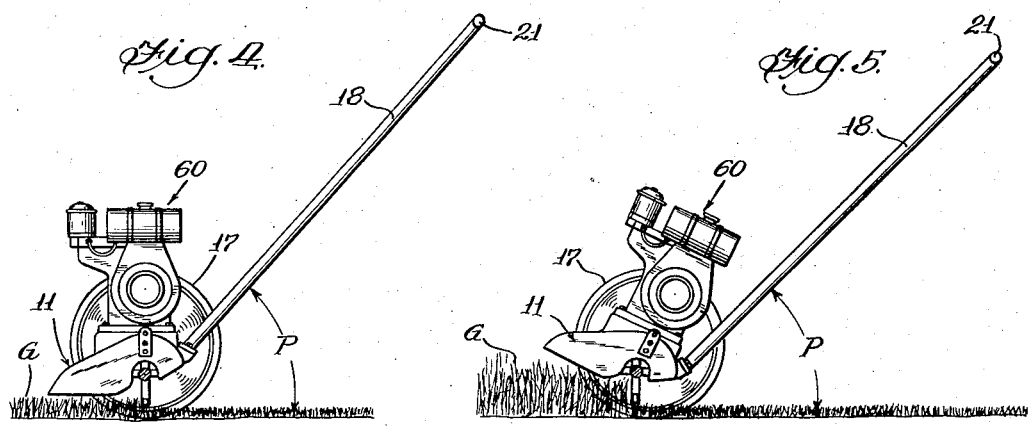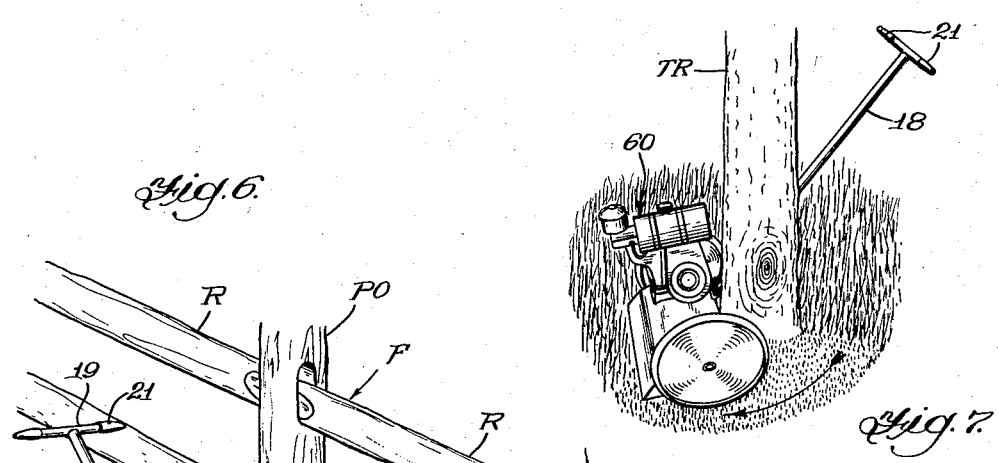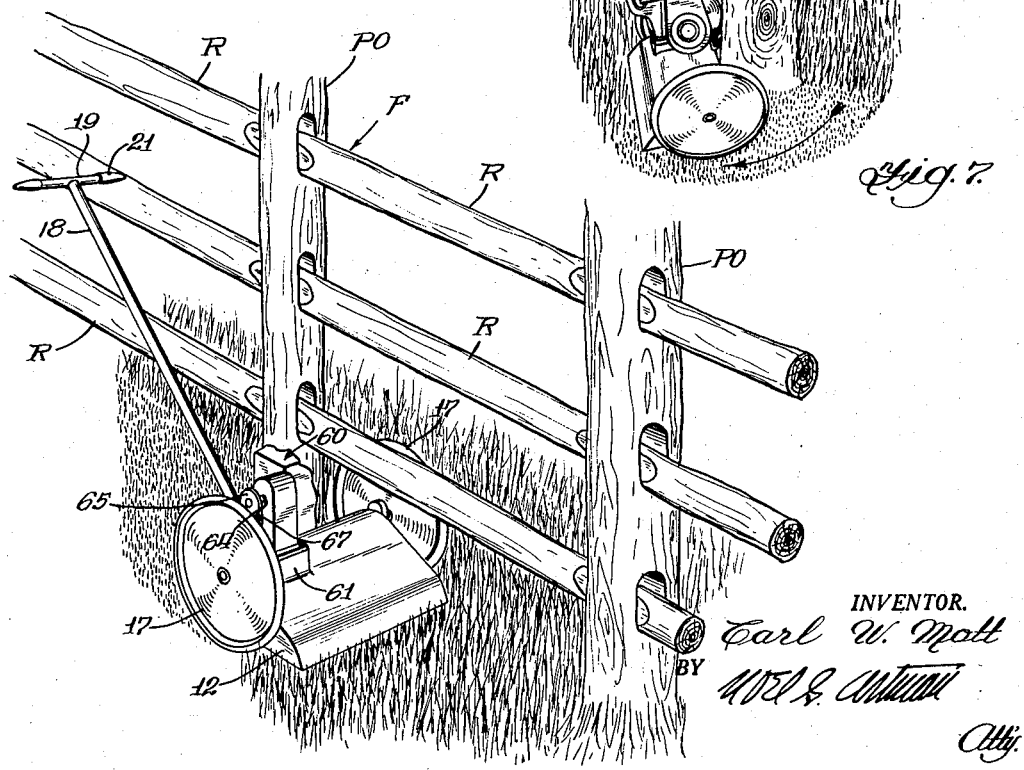

2,871,644

LAWN MOWER

Carl W. Mott, Lake Ozark, Mo., assignor to Mott Corporation, Brookfield, Ill., a corporation of Illinois Application January 10, 1955, Serial No. 480,796

5 Claims. (Cl. 56—26)

This invention relates to grass mowers suitable for mowing lawns and more particularly concerns mowers of the character employing a motor-driven rotor structure having revolving grass cutting instrumentalities.

The objects of this invention include the provision of:

A mower wherein the rotor structure is motor driven whereas the mower is propelled and guided by force applied manually through a handle attached to the mower frame.

A mower wherein ground engaging wheels are attached to opposite ends of an open-bottom hood-like frame eccentrically above the axis of a grass cutting rotor structure which is journalled within the ends of the frame.

A mower according to the next preceding object wherein ground wheel attaching means is operable to attach the wheel hubs at different elevations upon the frame to selectively determine the height of the grass cutting rotor structure above the ground surface.

A mower structure wherein the motor and the operator's handle are mounted upon a hood-like rotor-enclosing frame adjacent one end of the frame and the rotor therein to facilitate projection of the opposite end of the rotor beneath shrubbery and the like overhanging grass to be cut by the mower.

A mower structure having an open-bottom hood-like frame journalling a grass cutting rotor structure within opposite ends thereof and having a rear wall of semi-cylindrical shape adjacent the rotor structure and substantially coaxial with the rotational axis of such structure, an upper wall extending between the frame ends and projecting forwardly from an upper portion of the semi-cylindrical rear wall and a forward wall disposed spacedly forwardly from the rotor structure, the frame thus forming an open-bottom chamber portion forwardly of the rotor structure for confining and holding ground strewn leaves or the like accessibly to the rotor structure for comminution thereby into mulch-forming fragments.

The above and other desirable objects inherent in and encompassed by the invention are elucidated in the ensuing description, the appended claims and the annexed drawings, wherein:

Fig. 1 is a perspective view of a lawn mower embodying a preferred form of the invention.

Fig. 2 is an enlarged fragmentary sectional view taken at the plane indicated by the line 2—2 in Fig. 1.

Fig. 4 is a side elevational view of the mower with the ground engaging wheel nearest the viewer removed and showing a rotor shaft in section, the view illustrating the mower with the operating handle in one of two alternative attaching positions upon the mower frame.

Fig. 5 is a view corresponding to Fig. 4 but showing the handle in the alternative attached position.

Fig. 6 is a perspective view of the mower with a portion of the motor broken away, and illustrating the manner in which the mower is operable beneath a species of fence.

Fig. 7 is a perspective view illustrating a manner of maneuvering the mower for cutting grass about a tree trunk.

Figure 3:
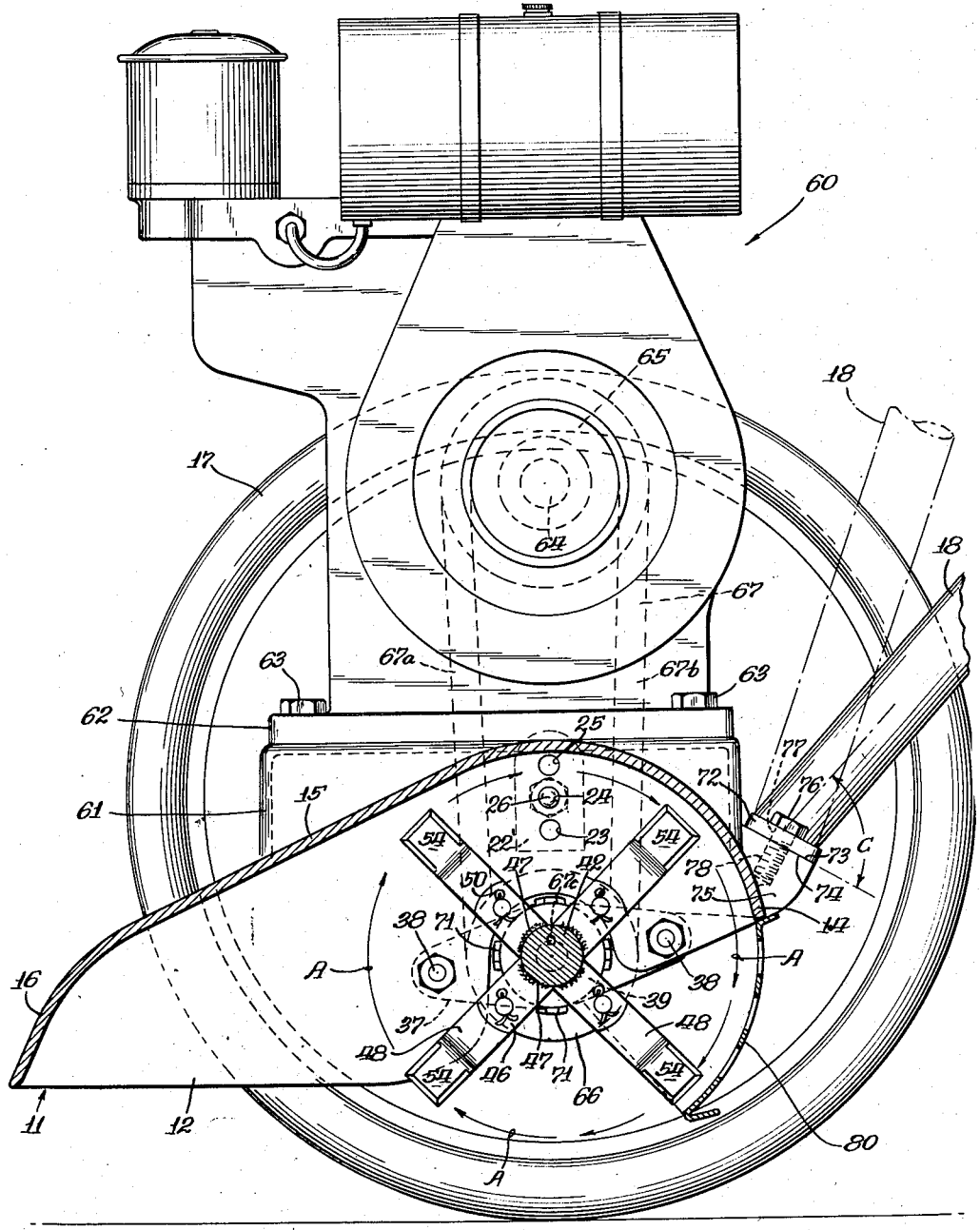
Fig. 3 is an enlarged sectional view taken transversely through a hood frame and grass cutting rotor structure of the mower, the view being taken at the plane indicated by the line 3—3 in Fig. 1.

With continued reference to the drawings and particularly to Figs. 1, 2 and 3, the mower can be seen to be built about an open-bottom hood-like frame 11 which in the present embodiment is in the form of a single piece casting, preferably of a low specific gravity metal as aluminum. This hood-like frame has end walls 12 and 13, a semi-cylindrical rear wall 14 extending between the end walls, an upper wall 15 extending forwardly and downwardly from the upper portion of the rear wall 14, and a forward wall 16 extending downwardly from the forward end of the upper wall 15. The upper wall 15 and the forward wall 16 like the rear wall 14 extend lengthwise of the frame between the end walls 12 and 13.

The frame 11 is supported upon ground engaging wheels 17 and is propelled and guided by a handle 18 having a cross member 19 at its upper end with conventional hand grips 21. Frame end wall 13 has an integral boss 22 projecting endwise outwardly therefrom for attachment of one of the wheels 17. Boss 22 has three vertically spaced threaded bores 23, 24 and 25 each of which is adapted to receive the threaded shank 26 of a cap screw 27 constituting a wheel attaching member. A bearing portion 28 of the wheel attaching member 27 includes a sleeve 29 mounted on the shank 26 between the outer end of the boss 22 and a head 31 of such member. The sleeve 29 has permanently fixed thereon, as part of the bearing portion 28, an annular bearing race structure 32 which is complemental to an outer bearing race member 33 in the formation of a ball bearing unit 34 including a plurality of bearing balls 35. The outer bearing race 33 also constitutes a hub for the wheel 17. The ground engaging wheel 17 at the opposite end of the mower frame 11 is mounted thereon by means of an end wall boss 22' shown dotted in Fig. 3 which is identical with the boss 22 with the exception of projecting a greater distance outwardly from the outer face of the end wall 12 than the boss 22 projects outwardly from the outer face of the end wall 13. Wheel mounting boss 22' is made longer for causing the wheel 17 associated therewith to be spaced a greater distance from the frame wall 12 than the other wheel 17 is spaced from the frame wall 13. Threaded bores 23, 24 and 25 in the boss 22' are respectively coaxial with the bores 23, 24 and 25 in the boss 22, and the shanks 26 of the wheel attaching members 27 shown in Figs. 1 and 3 are in the coaxial threaded bores 24.

Each of the end walls 12 and 13 has a notch 36 in its lower edge. Generally elliptical bearing hanger plates 37 disposed with their major axes generally horizontally are respectively attached to these end walls by means of bolts 38 of which the shanks extend through holes within end portions of these plates and through holes in the frame end walls upon opposite sides of the notches 36. In this manner the bearing hanger plates 37 are so mounted upon the frame end walls that bearing units 39 respectively supported thereby within the notches 36 are disposed in coaxial relation. The common axis of these bearing units 39 is also disposed coaxially with the semi-cylindrical rear wall 14, Fig. 3, of the mower frame.

A rotor structure 41 comprises a shaft 42 having opposite end portions respectively journalled within the bearing units 39. A threaded reduced diameter portion 43 of the rotor shaft 42 receives a nut 44 which cooperates with a shoulder 45 of the shaft for clamping the shaft to the bearing unit 39 shown in Fig. 2 to prevent endwise movement of the shaft relatively to the mower frame while the shaft is freely rotatable within the bearing units 39. The rotor shaft has a plurality of pairs of flail attaching ears 46 mounted thereon by welding 47 illustrated in Figs. 2 and 3. Each pair of apertured ears 46 has a pair of flails 48 pivotally attached therebetween by a headed pin 49 of which the shank 51 extends through apertures 52 and 53 respectively within the ears and the flails. Cotter pins 50 prevent accidental displacement of the pins 49 from the apertured ears. Each flail 48 has a laterally extending cutter end portion 54, and the flails are arranged in back to back relation in each pair so the cutter end portions thereof project in diverging relation as illustrated in Fig. 2 to cut miniature swaths through the grass, designated G in Figs. 4 and 5, attendant to rotation of the rotor structure 41.

The pairs of flail attaching lugs or ears 46 are arranged in rows lengthwise of the shaft 42, there being four of such rows spaced 90° apart circumferentially of the shaft. The pairs of apertured ears in these rows are staggered circumferentially of the shaft so they define a spiral pattern circumferentially about the shaft and are spaced sufficiently closely axially of the shaft that the miniature swath cut through the grass by each pair of flails 48 will overlap the swaths cut by the flails on either side thereof axially of the shaft.

The rotor structure 41 is rotated by power received from a motor 60 which may be in the form of a light weight internal combustion engine mounted upon a mounting pad 61 formed integrally with the upper wall of the frame 11 adjacent the end wall 12. The base 62 of the motor 60 is secured to the mounting pad 61 by cap screws 63. The outer end of the motor crank shaft 64, Fig. 6, drives a belt pulley 65 mounted thereon. In Figs. 3 and 6 it can be seen that the crank shaft 64 and such pulley 65 rotate about an axis above and in parallelism with the axis of the rotor shaft 42. An end portion of the rotor shaft extending outwardly beyond the outer side of the mower frame end wall 12 has a belt pulley 66 keyed thereto at 67c. Pulley 66 is in a common plane with the engine crank shaft pulley 65 so that a belt 67 trained over these two pulleys serves as a driving connection therebetween so that during operation of the motor 60 the rotor structure 41 including the grass cutting flails 48 will be rotated in the direction of the arrows A, Fig. 3. Centrifugal force thus generated in the flails 48 causes them to extend radially outwardly from the rotor shaft 42 as illustrated in Figs. 2 and 3.

Two vertical flights 67a and 67b of the belt 67 are on opposite sides of the wheel mounting boss 22' and are disposed between the frame end wall 12 and the wheel 17 adjacent thereto. Clearance for the belt flights 67a and 67b between the wheel and the frame wall 12 is provided because of the boss 22' being longer endwise of the mower frame than the boss 22. Winding of grass stems about the shaft end portions is precluded by anti-wind washers 68 mounted upon opposite end portions of the rotor shaft 42 for rotation therewith respectively adjacent bearing unit carrier sleeves 69. Axial projections 71 of these washers 68 project over the outer periphery of the sleeves 69 to sweep thereabout and cut away any grass stems which would have a tendency to lodge thereon.

The lower end of the mower handle 18 has a mounting flange 72 with a mounting end face 73 for attaching in abutting relation with a mounting face 74 on a handle attaching boss 75 formed integrally with the frame rear wall 14. A pair of cap screws 76 on opposite sides of the handle 18 extend through respective holes 77 in the flange 72 into respective threaded recesses 78 of the boss 75 for detachably mounting the handle upon this boss.

In Fig. 3 it will be noted that the end face 73 of the handle mounting flange 72 is disposed at an included angle C formed between the axis of the handle and the plane of such face. This makes it possible to attach the handle upon the boss in the manner illustrated in Fig. 3 or alternatively to attach the handle in the dot-dash line position illustrated therefor in Fig. 3 by rotating the handle 180° about its principal axis before securing it in place by the cap screws 76.

The mower is set in operation by conventionally cranking the motor 60 and thus causing it to transmit power through the crank shaft pulley 65, belt 67 and the pulley 66 for constantly rotating the rotor structure 41 in the clockwise direction as viewed in Figs. 3, 4 and 5. Since the rotor structure is power driven it is relatively easy to vehicularly propel the mower by manual force applied to the handle grips 21 upon the handle 18. While the handle 18 is attached to the mounting boss 75 as illustrated by the full lines in Fig. 3 and in Fig. 4, disposition of the handle at the normal inclination angle P with respect to the ground causes the lower edge of the front wall 16 of the hood frame 11 to be disposed a relatively short distance above the ground for passing over uncut grass G, Fig. 4, of modest height. As the power driven rotor structure rotates, the diverging cutter end portions 54 of the flails 48 cut the grass and carry most of the grass stems cut thereby upwardly against the underside of the upper frame wall 15 and backwardly along the under and forward side of the semi-cylindrical rear wall 14. Normally a semi-cylindrical and perforated leaf mulch plate 80 is detached from the hood frame 15 so that the grass stems carried upwardly and rearwardly by the flails are discharged downwardly to the rear of the rotor structure while the mower is being vehicularly advanced. Therefore, when the mulcher plate 80 is removed from the mower the cut grass stems will normally be discharged upon the stubble of the cut grass rearwardly of the nadir of the circular path traversed by the flail end portions wherefor the cut grass stems will not interfere with the operation of the flails in making a clean cut of the uncut grass.

The height that the frame 11 and rotor structure 41 is supported by the wheels 17 above the ground may be selected by placing the wheel attaching members 27 in different sets of the threaded bores 23, 24 or 25. In the drawings the wheel attaching members are disposed in the center set of bores 24 but by placing the members 27 in the bores 23 the frame 11 and rotor structure can be raised from the ground to leave a longer grass stubble and by placing the members 27 in the upper set of bores 25 the frame and rotor structure can be lowered so the machine will leave a shorter grass stubble. It can be observed in Figs. 3 and 4 that the wheel attaching member receiving bores 23, 24 and 25 are above the rotor structure axis and within a vertical plane coincident with such axis. Consequently, should the operator change the elevation of the handle bar 19 while pushing the machine, the consequent rocking of the mower frame 11 about the axis of the wheel hubs will cause the rotor structure to swing principally along the lower portion of an arc described about the wheel axis and therefore not materially change the elevation of the rotor structure for varying the height of the cut grass stubble.

A further advantage of attaching the wheel hubs to the mower frame 11 eccentrically of the rotor structure axis is that the wheels can be mounted nearer to their respective ends of the rotor structure wherefore the swath cut by the mower can be caused to more nearly approach obstructions along which the wheels may at times be caused to roll. Furthermore, by placing the wheel attaching members at higher elevation than the axis of the rotor structure the wheels can be made of greater diameter without the necessity of the rotor structure, including the radially distended flails, being correspondingly increased in diameter to reach downwardly to the desired spacing from the ground. Larger diameter wheels are adapted to more effectively span miniature pits within the turf and to therefore roll more easily over such pits and miniature hummocks. Consequently the large diameter wheels diminish the manual effort required to propel and steer the mower.

Close proximity of the wheels to the ends of the rotor structure is also attained by employing a hub structure 33 of short axial extent and relatively large diameter. The large diameter of the ball bearing unit 34 is effective for maintaining the wheels within a plane truly transversely of its rotational axis just as effectively as a structure employing an axially longer hub of smaller bearing diameter. After assembly of the bearing balls 35 within the inner and outer races 30 and 33 and the sliding of a supplementary race ball-retaining ring 30b in position upon the inner race 30, an end portion 30c of the race member 30 is peened radially outwardly over the outer side of the retaining ring 30b for maintaining the bearing unit 34 in assembly.

When the semi-cylindrical mulcher plate 80 is mounted upon the mower frame as a downward extension of the rear wall 14, the mower is adapted to operate as a leaf mulcher. The thus equipped mower when pushed along the ground over fallen leaves will sweep the leaves upwardly against and rearwardly along the underside of the upper wall 15 and thence downwardly along the wall 14 and the inner periphery of the mulcher plate 80 which directs the large portions of the leaves fragmentated thereby forwardly for repeated treatment by the rotating flails. The space under the hooded frame between the rotor and the front wall 16 accommodates a quantity of the leaves and subjects them to the rotating flails. Those portions of the leaves which are cut by the flails into sufficiently small particles to sift downwardly into the grass stubble and become a mulch are discharged outwardly and rearwardly of the mower through the perforations of the plate 80.

Sometimes its becomes necessary to mow a lawn whereon the grass G is higher than is readily accommodated beneath the lower edge of the frame front wall 16 unless the frame is tilted about the hubs of the wheels 17 as illustrated in Fig. 5 to raise the front side of this hood-like frame. When this condition prevails the operator will detach the handle 18 from the mounting boss 75 and rotate the handle 180° before reattaching it in the dot-dash position illustrated in Fig. 3 so that the operator can maintain the handle at the convenient angle P, Fig. 5, with the ground surface while operating the mower.

In Figs. 1, 6 and 7 it can be seen that the handle 18 is attached to the hood-like mower frame 11 adjacent the end wall 12 thereof in fore and aft alignment with the mounting pad 61 for the motor 60. This leaves a clearance space above the frame 11 between the motor 60 and the frame end wall 13 to facilitate the disposition of that part of the rotor structure covered by this portion of the hood-like frame beneath overhanging shrubbery while the operator can proceed beside the shrubbery out of contact therewith while grasping the offset handle 18. Such offset mounting of the motor 60 and the handle 18 facilitates convenient operation of the mower beneath certain kinds of fences as that illustrated in Fig. 6 having horizontal rails R supported by posts PO. While the wheel 17 adjacent the frame end wall 13 is disposed upon the opposite side of the fence with respect to the handle 18, the operator can walk conveniently along the fence while gripping and pushing upon the handle grips 21.

The offset mounting for the handle 18 and motor 60 also expedites close mowing with respect to the trunks of small trees in the fashion illustrated in Fig. 7. While the mower is associated with a tree trunk TR as shown in Fig. 7, the operator can pull rearwardly upon the handle grips 21 to pull the mower around the tree in the direction indicated by the curved ground line arrow while maintaining the rear wall 14 of the hood-like frame in contact with the tree trunk.

Since both the motor 60 and the handle 18 are offset in the same direction toward a common end of the mower frame, thrust applied to the frame manually through the handle 18 for propelling the mower will be applied in sufficient proximity to the center of combined mass of the frame, ground engaging wheels, rotor structure and motor that the mower has no tendency to veer from the direction of thrust lengthwise of the handle 18. Consequently the offset mounting of the handle requires no correction factor in the direction of thrust exerted by the operator to maintain the mower on a straight line course.

Having thus described a single preferred embodiment of the invention with the view of clearly and concisely illustrating the same, I claim:

1. A lawn mower comprising a rotor supporting frame in the form of an open-bottom hood having opposite axially spaced end walls, a substantially semi-cylindrical rear wall extending between rear portions of the end walls, an upper wall extending between upper portions of the end walls and extending forwardly and downwardly from an upper portion of the rear wall, and a front wall extending between the end walls and downwardly from a forward edge of the upper wall, rotor supporting bearing means respectively in said end walls substantially coaxially with the semi-cylindrical rear wall, the forward wall of the hood-like frame being disposed forwardly from said bearing means at least substantially twice the distance that the bearing means are spaced forwardly from the portion of the rear wall which is at the same elevation as the common axis of said rotor supporting bearing means, a grass cutting rotor structure within the hood-like frame and extending between and journalled in the rotor supporting bearing means, means for rotating the rotor structure in the direction to sweep the lower portion thereof forwardly and upwardly, wheel attaching bearings on the outer sides of the end walls above and substantially in vertical alignment with the rotor supporting bearings, and ground engaging wheels having hubs respectively journalled upon the wheel bearings.

2. The combination set forth in claim 1 wherein there is an operator's handle mounted upon said frame and projecting upwardly and rearwardly therefrom to serve as a guiding means for the mower and being operable attendant to changing the elevation of the upward and rearward portion thereof to swing the hood-like frame coaxially of the wheel hubs for changing the elevation of the front wall of such frame.

3. A lawn mower comprising a rotor supporting frame in the form of an open-bottom hood having opposite axially spaced end walls, a substantially semi-cylindrical rear wall extending between the end walls, a forward wall extending between the end walls and an upper wall extending between the end walls and disposed between the rear and forward walls, coaxial rotor supporting bearings disposed respectively on the end walls and with their common axis substantially nearer to the rear wall than to the front wall, a grass cutting rotor structure shrouded by the frame and extending between and journalled in said bearings to place a rear portion of such structure in contiguity with the rear wall and to place a front portion of such structure in substantial spaced relation from the front wall, means for rotating the rotor structure in the direction to sweep the lower portion thereof forwardly and upwardly, wheel attaching bearings on the end walls above and substantially in vertical alignment with the rotor supporting bearings, ground engaging wheels adjacent the outer sides of the frame end walls and having hubs respectively journalled upon the wheel bearings, an operator's handle projecting upwardly and rearwardly from the frame at an acute angle to a horizontal plane tangential to the lowest portions of the wheels, and means for attaching the handle to the frame in selective positions for tilting the frame about the wheel hubs and thus disposing the front wall of the frame at respectively different distances above such plane while the handle occupies such acute angle.

4. The combination set forth in claim 3, wherein the handle attaching means comprises complemental elements respectively on the mower frame and the lower end of the handle, said elements having separable mating surfaces normal to a median line extending upwardly and rearwardly from the mower frame, the mating surfaces being cooperable to maintain the normal relation of the handle element face irrespective of whether such element is in either of two positions 180° apart rotatively of the median line, and the handle occupying an angled relation to the mating surface of the attaching element thereof to be disposed angularly above such line while such attaching element is in one of the 180° spaced positions and disposed angularly below such line while such attaching element is in the other of the 180° spaced positions, and means for detachably holding the mating surfaces together selectively in the two rotative positions of the handle attaching element.

5. The combination set forth in claim 3, wherein the handle attaching means comprises complemental elements respectively on the mower frame and the lower end of the handle, said elements having mating surfaces cooperable to maintain a coaxial relation of such elements about a median line disposed angularly to the handle and bisecting different angular positions occupied by the handle with respect to said horizontal plane attendant to placement of the handle in respective positions 180° apart rotatively of such median line.

References Cited in the file of this patent

UNITED STATES PATENTS

| | | |
|---|---|---|
| 2,319,038 | Clemson | May 11, 1938 |
| 2,477,442 | Cramer et al. | July 26, 1949 |
| 2,484,989 | Funk | Oct. 18, 1949 |
| 2,486,969 | Nelson | Nov. 1, 1949 |
| 2,590,065 | Mott | Mar. 18, 1952 |
| 2,651,904 | Jatunn | Sept. 15, 1953 |